United States Patent [19]
Son et al.

[11] Patent Number: 5,846,891
[45] Date of Patent: Dec. 8, 1998

[54] THERMAL SHOCK-RESISTANT ALUMINA-MULLITE COMPOSITE MATERIAL AND PREPARATION METHOD THEREOF

[75] Inventors: Yong Bai Son, Seoul; In-Jae Jung, Incheon; Sang-Woo Kim, Seoul, all of Rep. of Korea

[73] Assignee: Korea Institute of Science and Technology, Seoul, Rep. of Korea

[21] Appl. No.: 872,641

[22] Filed: Jun. 10, 1997

[51] Int. Cl.[6] .......................... C04B 35/10; C04B 35/14; C04B 35/16
[52] U.S. Cl. .................. 501/127; 501/118; 501/122; 501/125; 501/119; 501/128; 501/105; 428/689; 428/697; 428/699; 264/66
[58] Field of Search ...................... 501/127, 128, 501/130, 131, 105, 119, 118, 122, 125; 428/689, 697, 699; 264/66

[56] References Cited

U.S. PATENT DOCUMENTS

| | | | |
|---|---|---|---|
| 3,003,887 | 10/1961 | Kiehl et al. | 501/130 |
| 3,128,194 | 4/1964 | Christie, Jr. | 501/130 |
| 3,773,532 | 11/1973 | Manigault | 501/131 |
| 3,998,648 | 12/1976 | Thrower et al. | 501/127 |
| 5,344,800 | 9/1994 | Jackson et al. | 501/127 |

FOREIGN PATENT DOCUMENTS

| | | | |
|---|---|---|---|
| 676538 | 7/1952 | United Kingdom | 501/131 |

OTHER PUBLICATIONS

Powell–Dogan, C.A. et al., *J. Am. Ceram. Soc.*, 73(12):3684–3691 (1990) (no month).

Travitzky, N.A. et al., *Materials Science and Engineering* 71:65–70 (1985) (no month).

*Primary Examiner*—Michael Marcheschi
*Attorney, Agent, or Firm*—Morrison & Foerster

[57] ABSTRACT

A thermal shock-resistant alumina-mullite composite material and a preparation method thereof which are capable of concurrently obtaining the compactness of the material and a mullite formation. The material is comprised of 4~30 weight % of one aluminum silicate selected from the group consisting of kaolinite, silimanite, and kyanite, 75~94 weight % of $Al_2O_3$ based on the total amount of $Al_2O_3$, and 0.5~6 weight % of an alkaline earth metal oxide, wherein the weight ratio of the alkaline earth metal oxide to $SiO_2$ is 1:2~1:3. The composition is first sintered at a temperature of 1450°~1650° C. for 1~5 hours, then cooled down to 1000° C., and then crystallized at a temperature of 1200°~1500° C. for 1~20 hours. This composition is usable to a maximum temperature 300° C. as indicated theraml- shock-resistant testing, and is well application to a part subject to wide thermal variation and for which a conventional 85%~96% alumina material is not usable.

8 Claims, No Drawings

THERMAL SHOCK-RESISTANT ALUMINA-MULLITE COMPOSITE MATERIAL AND PREPARATION METHOD THEREOF

BACKGROUND OF THE INVENTION

1. Field of the Invention

The present invention relates to a thermal shock-resistant alumina-mullite composite material and a preparation method thereof, and in particular to an improved alumina-mullite composite material and a preparation method thereof which composition is well adopted to an environment where temperature variation and thermal shock are high by improving a thermal shock-resistant characteristic of the same.

2. Description of the Conventional Art

Alumina-ceramic compositions have excellent mechanical, chemical, and electrical characteristics, and the cost thereof is low. Therefore, alumina-ceramic compositions are used for an IC package, a hybrid circuit substrate, an industrial ceramic, and a structural ceramic. However, since such compositions are weak when subjected heat, such compositions are not suitable for elements and components which are exposed to heat. Generally, in the case of a compact alumina composition having an alumina content of over 80%, when the alumina is quickly cooled in water, the temperature difference $\Delta Tc$ at which the alumina sustains the thermal-shock is about 150°~180° C.

In order to overcome the disadvantages of the ceramic material, which is too easily breakable due to its low mechanical strength, much study has been performed in order to increase the strength and toughness of the material. For example, study is focused on a composite material such as alumina/mullite, alumina/zirconia, etc., which is well applicable to a structural ceramic.

As materials having an excellent thermal characteristic, there are known a cordierite material and a mullite material which are used for a vehicle exhaust gas catalytic substrate, etc. However, such materials have very low mechanical strength compared to alumina.

Mullite has an excellent thermal characteristic and a small thermal expansion ratio with respect to alumina, so that mullite is used as a component for preparing a composite material. If mullite is mixed with an alumina or is formed in an alumina, although the strength thereof becomes decreased, a thermal expansion ratio can be decreased, and a spalling characteristic and a thermal shock-resistant characteristic can be improved, so that it is possible to extend the life time of the material. However, since mullite is small-sized and has a low grain boundary diffusion coefficient, a sintering process must be performed at a high temperature, and a sintering characteristic is not good due to glass being formed at the boundary.

As a method for preparing a mixed alumina-mullite composition, there is known a method for crystallizing the mullite at the grain boundary of a liquid phase-sintered alumina.

In order to form a mullite at an alumina grain boundary, the mullite must be crystallized in the glass phase. For this purpose, alumina and silica agents must be added; however, the above-described two agents are not desirable because the glass formation temperature is high, and the fluidity of the glass is very low, so that it is impossible to achieve a desired densification. In addition, since such compositions are not easily changed into a glass, a prematured crystal may be formed during a sintering operation. In addition, since the fluidity of the glass is low, it is impossible to obtain a desired density.

Namely, the mullite crystal is formed from a glass composition having a high alumina content. However, at the above-described composition, since the viscosity of the glass is high, the structure of the glass is made unstable because a desired density of alumina is not obtained during the sintering. In order to overcome the above-described problems, a sol-gel is provided for forming a mullite in a porous alumina, and then is sintered, for thus forming an alumina/mullite composite. However, this method can not be suitable for mass production.

Therefore, since it is not easy to form a mullite at an alumina grain boundary, fine mullite powders are added into alumina as a seed crystal, for thus expediting the crystallization of a mullite. However, the added mullite seed crystal interferes with the sintering in liquid state based on the fluidity of the glass, so it is impossible to obtain a compact alumina sintering material. An example was reported that a predetermined amount of glass frit, and 10~20 weight % mullite (hereinafter, % denotes weight %) were added into alumina, for thus preparing a semiconductor packaging material. Therefore, since when a lot of mullite is added into alumina, the densification of the material is not achieved, a small amount of mullite is added, so that it is impossible to actually achieve a characteristic improvement.

Therefore, in order to obtain an improved alumina/mullite composite having a desired thermal shock-resistance, the formation of a mullite having a high strength and good thermal-resistance and shock-resistance is preferably needed. However, when the mullite is added as a seed material, the liquid sintering is interfered therewith, and it is impossible to obtain a desired density. In addition, when forming a mullite at a grain boundary in glass phase through a molding process, since the mullite is formed under a condition that the glass content is high, the density of the glass is very high, so that it is impossible to obtain a compactly sintered material because it is not achieved during the molding process.

In addition, in order to improve the sintering characteristic of the alumina ceramic and lower the molding temperature, a glass such as silica, calcium oxide, magnesium oxide is added. For example, an alumina product made of alumina of 85~94% is heated at a temperature of 1000°~1300° C. in order to re-crystallize a glass existing at a boundary surface for improving a mechanical and thermal shock-resistant characteristic. However, since adding $SiO_2$, MgO, and CaO, etc. to the conventional alumina generally forms a grain boundary surface composition of MgO—CaO—$Al_2O_3$—$SiO_2$, the thusly formed crystals are anorthite, spinel, forsterite, cordierite, quartz, etc., and the secondary phases have a relatively low strength and do not influence the toughness improvements, as disclosed in "Powell-Dorgan, A. H. Heuer, J. Am. Ceram. Soc., 73 (1990) 3684." In particular, since the cordierite having a good thermal characteristic is different from alumina with respect to thermal expansion coefficient, cracks may easily occur due to the residual stress. In addition, since a mechanical property is much lower than the alumina, the applicable range of the cordierite is limited. It was disclosed that the strengthening effect due to the residual stress at the glass grain boundary was improved by quickly cooling the same after a molding process, rather than the crystallization process in N. A. Travitzky et. al., Material Science and Engineering, 71 (1985) 65–70. However, in this case, when the resultant structure is heat-treated at a temperature of 800°~1000° C., the strengthening effect was eliminated by a quenching process.

SUMMARY OF THE INVENTION

Accordingly, it is an object of the present invention to provide a thermal shock-resistant alumina-mullite composite material and a preparation method thereof which overcome the aforementioned problems encountered in the conventional art.

It is another object of the present invention to provide an improved thermal shock-resistant alumina-mullite composite material and a preparation method thereof which are capable of concurrently obtaining the compactness of the material and a mullite formation.

To achieve the above objects, there is provided a thermal shock-resistant alumina-mullite composite material which is comprised 4~30 weight % of one aluminum silicate selected from the group consisting of kaolinite, silimanite, and kyanite, 75~94 weight % of $Al_2O_3$ based on the total amount of $Al_2O_3$, and 0.5~6 weight % of an alkaline earth metal oxide, wherein the molar ratio of the alkaline earth metal oxide to $SiO_2$ is 1:2~1:3.

To achieve the above objects, there is also provided a preparation method of a thermal shock-resistant alumina-mullite composite material, which is comprised of 4~30 weight % of one selected from the group consisting of kaolinite, silimanite, and kyanite, 75~94 weight % of $Al_2O_3$ based on the total amount of $Al_2O_3$, and 0.5~6 weight % of an alkaline earth metal oxide, wherein the molar ratio of the alkaline earth metal oxide to $SiO_2$ is 1:2~1:3, and first molding the mixture at a temperature of 1450°~1650° C. for 1~5 hours, cooling down the modled body to 1000° C., and then crystallizing at a temperature of 1200°~1500° C. for 1~20 hours.

Additional advantages, objects and features of the invention will become more apparent from the description which follows.

DETAILED DESCRIPTION OF THE INVENTION

An alumina/mullite composite having a mechanical and thermal shock-resistant characteristic according to the present invention is formed of 4~30 weight % of one aluminum silicate selected from the group consisting of kaolinite, silimanite, and kyanite, 75~94 weight % of $Al_2O_3$ based on the total amount of $Al_2O_3$, and 0.5~6 weight % of an alkaline earth metal oxide, wherein the molar ratio of the alkaline earth metal oxide to $SiO_2$ is 1:2~1:3.

The kaolinite, silimanite, or kyanite are used to form a mullite crystal during sintering. These materials are used for controlling the amount of $SiO_2$. Since the glass is formed at a low temperature by adding kaolinite, silimanite or kyanite, it is possible to easily obtain a desired compactness of the material.

For example, kaolinite is a naturally occurring material including alumina and silica. The mullite crystal is formed at over 1500° C. during a solid sintering, and in the kaolinite, since Al and Si ions are uniformly mixed at the atomic level, very small and uniform mullite crystal are crystallized at a temperature of around 1250° C. which temperature is relatively low. In order to prepare an alumina/mullite composite material, kaolinite is added as a seed for the mullite crystallization. If kaolinite is added in an amount of below 4%, a small number of mullite crystals are formed and those crystals are dissolved into the glass phase. If kaolinite is added in an amount of over 30%, the mullite is crystallized during the sintering process, for thus affecting the densification of the material formed.

$Al_2O_3$ is dissolved into the glass during the molding process and forms a glass component. Since $Al_2O_3$ may be provided from a natural material such as kaolinite, silimanite, or kianite, the amount of $Al_2O_3$ which is independently added based on the amount of $Al_2O_3$ among the kaolinite, silimanite, or kyanite is adjusted to be 75~94 weight %.

Since the alkaline earth metal oxide widens the formation range of the glass and lowers the density of the glass during the molding process, the alkaline earth metal oxide is added in an amount of 0.5~6%. A liquid sintering characteristic, a crystalline phase form, and a crystallization rate are determined in accordance with the adding amount and kind of the alkaline earth metal oxide. For example, when CaO as an alkaline earth metal oxides is added, the rate of crystallization is increased. When kaolinite is added in an amount of less than 0.5%, the stability of the glass may be degraded, so that it is impossible to obtain a compacted sintering material. If the alkaline earth metal oxide is added in an amount of over 6%, since the glass is stabilized, the crystallization is not performed during the re-heating process, so that it is impossible to crystallize the mullite.

As the alkaline earth metal oxide, one or more among MgO, CaO, SrO or BaO may be used. Preferably, MgO may be independently as well as together with another alkaline earth metal oxides used.

$SiO_2$ may be further added so that the ratio between the total amount of alkaline earth metal oxide and $SiO_2$ becomes 1:2~1:3.

$SiO_2$, the main component for the glass formation, adjusts the fluidity of glass and forms the glass by reacting with $Al_2O_3$ and the alkaline earth metal oxide. $SiO_2$ is added proportionally to the amount of the mullite formed. If the amount of $SiO_2$ is smaller than that corresponding to a ratio 1:3 of the total amount of alkaline earth metal oxide to $SiO_2$, the glass will not be well formed, and if the ratio of the total amount of the alkaline earth metal oxide and $SiO_2$ is greater than 1:2, the glass will be too stably formed, and therefore, it is difficult to generate the mullite at a recrystallization temperature.

In the composite of the present invention, less than 3 weight % of the alkaline metal oxide and/or less than 10 weight % of $ZrO_2$ may be further added.

The alkaline metal oxide, which helps the liquid state sintering, is added in an amount of below 3 weight % by adjusting the dissolving characteristic of the glass. If the alkaline metal oxide is added in an amount of more than 3%, over-sintering occurs under the condition that the temperature of the glass viscosity is low. As an alkaline metal oxide, $K_2O$ is usable.

$ZrO_2$ acts as a crystallization agent and promote a sintering of the alumina. If $ZrO_2$ is added in an amount of 1~5%, the deposition of the same occurs at the boundary and increases the tenacity at the boundary. In addition, at 5~10%, $ZrO_2$ increases the tenacity at the boundary and of the volume. However, if more than 10% $ZrO_2$ is provided, the $ZrO_2$ increases the tenacity of the volume of the alumina rather than increaseing the tenacity at the boundary, so that it is impossible to obtain a desired effect, differently from the originally desired effect.

In addition, the present invention is directed to an improved alumina/mullite composite material preparation method, which material has a mechanical and thermal shock-resistant characteristic.

In the method according to the present invention, one aluminum silicate selected from the group consisting of kaolinite, silimanite and kyanite is added in an amount of 4~30 weight %, 75~94 weight % of $Al_2O_3$ based on the total amount of $Al_2O_3$, and 0.5~6 weight % of an alkaline earth metal oxide are mixed. At this time, the molar ratio of the total amount of alkaline earth metal oxide to $SiO_2$ is 1:2 - 1:3, and the resultant mixture is first molded at 1450°~1650°

C. for 1~5 hours, then cooled to below 1000° C., and then the resultant structure is crystallized at 1200°~1500° C. for 1~20 hours.

Therefore, it is possible to prepare an alumina/mullite composite material by forming a mullite in the glass at the alumina grain boundary. The material, which is capable of providing a glass composition by which it is possible to form mullite, is selected, and is optimized through a heat-treating process, so that it is possible to prepare a compact alumina-mullite composite material having an excellent thermal shock-resistant characteristic and a large mullite content.

In order to form the mullite in the glass at the alumina grain boundary, in an example according to the present invention, kaolinite is used as a part or the entire of the silica source. The glass is formed at the alumina grain boundary, and then the resultant structure is first molded at a temperature of 1450°~1650° C. for obtaining a desired density.

In the case that only $SiO_2$ is used, as a silica source, the mullite is not formed during the molding process, and the mullite crystal is formed by a solid sintering process at a temperature of above 1500° C. Differently, the material in which Al and Si ions are uniformly mixed such as kaolinite, silimanite, or kyanite forms mullite crystals at a temperature of 1100°~1300° C., and since the thusly formed mullite crystals have a diameter of tens of nm, the same does not degrade the compactness.

In addition, under the composition condition and first molding condition according to the present invention, since the glass formed through the molding process is stable, the mullite particles are not well formed, so that the alumina material can be compacted through the sintering process.

The resultant structure is first sintered at a temperature of 1450°~1650° C., and the interior temperature of the furnace is lowered to below 1000° C., and the sintered compound is maintained at a temperature of 1200°~1500° C. for 1~20 hours. Thereafter, the resultant structure is heat-treated again, for thus forming mullite crystals at the boundary.

According to the generally known method, if the kaolinite is heated to a temperature of 1100°~1200° C. for 4 hours, first mullite crystal having a size of 500 Å are formed. In this case, the structure has a large aspect ratio. The thusly formed first mullite is heated, and becomes stable and then the phase having high silica content and the alumina are reacted, for thus forming second mullite crystals. If the resultant structure is processed at a temperature of 1300° C. for 4 hours, much mullite is formed. If the resultant structure is processed at a temperature of 1400° C. for 4 hours, mullite crystals are grown in the glass. The small crystals of the mullite are formed as the alumina is dissolved into the liquid silica having high silica content.

In the present invention, in the case that the mullite formation is implemented by only the silica composition, the mullite is not formed. Namely, the alumina must be continuously dissolved so that the glass is formed having much alumina by which the mullite can be formed. However, it is impossible to form such glass having much alumina based on the thermal dynamic theory. Even if such glass is formed, the fluidity is low, for thus forming pores and degrading the compactness of the structure.

In the present invention, since a material is used in which Al and Si ions are uniformly mixed such as kaolinite, silimanite, or kyanite, it is possible to form mullite at a temperature of 980°~1200° C., so that after a glass is formed, a small amount of mullite crystals remain, and then the mullite crystal grow at the temperature of recrystallization. At the time of growing the mullite crystals at the temperature of recrystallization, the shape and amount of the crystals are made different in accordance with the composition of the glass and the material used.

The ceramic material is limited in use for various applications due to a thermal shock or a thermal fatigue phenomenon. In particular, if the ceramic material is used for an electrical part, turbine wings, or radiator ceramics, the thermal characteristic becomes a major factor. The thermal shock resistance may be expressed as the following equation.

$$R = \sigma(1-v)/E\alpha$$

where R denotes the thermal shock resistance, $\sigma$ denotes Poisson's ratio, E denotes Young's elastic modulus, and $\alpha$ denotes the thermal expansion coefficient. The thermal shock resistance characteristics which are most widely and experimentally used are indicated as the bending strength which is changed due to the residual stress after the sample is quickly cooled in water and is indicated as the temperature at which the strength of the sample is quickly lowered. The thermal shock resistance characteristics of the ceramic are related to the thermal expansion coefficient, Young's modulus, and surface energy. In addition, the limit temperature difference ($\Delta Tc$) of the thermal shock varies based on the shape and size of the sample. Thermal shock-resistance test sample is processed with polished surfaces, and as the cooling water for the thermal shock-resistance test, distilled water having a temperature of ±1°~2° C. is used. At this time, a substantial amount of distilled water is used so that the temperature does not vary during the rapid cooling test.

The embodiment of the present invention is not limited to the following disclosed examples.

EXAMPLE I

Alumina/mullite composite material sample preparation

Silica ($SiO_2$), kaolinite (in which 46.5 weight % of $SiO_2$ is added) magnesium oxide, gamma alumina, etc. were prepared with respect to alumina of purity of 99.5% (ALM 43, Sumitomo Company) based on the composition ratio of Table 1. The thusly prepared constitulents were placed into a polyethylene bottle, and distilled water was provided therein so that the weight ratio of the distilled water and powder becomes 1:1. Thereafter, polyvinyl alcohol (PVA #205, Kurarey Company), polyethylene glycol (#400, Union Carbide Company), dispersion agent (DARVAN-C, Vanderbily Company) were added in the amounts of 0.8%, 0.4%, and 0.1%, respectively, and mixed for 15 hours. The thusly mixed slurry was agitated by using an agitator and then was heated and dehydrated. Thereafter, the resultant mixture was ground and filtered using a #100 mesh filter, for thus forming a powder under a pressure of 1200 $kg/cm^2$. The thusly formed powder was molded to a disk shape having a diameter of 20 mm, and a height of 3 mm at a temperature of 1500°~1650° C. for 2 hours.

Table 1 lists the density, porosity, crystal phase formed after a first sintering, phase formed after crystallization, and thermal-resistance limit temperature of the sintered structure after the molding process.

Both surfaces of the sintered structure were polished by using a diamond disk, and then a thermal shock-resistance test was performed. The thermal shock-resistance test sample was heated at 5° C./min in an electrical furnace equipped with a tube, and then was maintained at a temperature 180°~400° C. for 30 minutes. Thereafter, specimen was quickly cooled in water, until cracks were observed, and then the thermal shock-resistant temperature ($\Delta Tc$) was measured. The thusly computed result is shown in Table 1.

TABLE 1

|  | #1 | #2 | #3 | #4 | #5 | #6 |
|---|---|---|---|---|---|---|
| $Al_2O_3$ | 84.2 | 84.4 | 84.6 | 82.5 | 86.5 | 84.6 |
| $SiO_2$ |  |  |  |  | 5.0 |  |
| MgO | 2.0 | 2.5 | 3.0 | 4.0 | 3.0 | 1.8 |
| CaO |  |  |  |  |  | 1.2 |
| kaolinite | 21.5 | 20.4 | 19.4 | 17.2 | 8.6 | 19.4 |
| density (g/cm³) | 3.42 | 3.41 | 3.40 | 3.24 | 3.24 | 3.40 |
| porosity (%) | 0 | 0 | 0 | 0 | 0 | 0 |
| crystal phase after first sintering at 1650° C. | — | — | — | spin (Sm) | — | — |
| mullite after second sintering at 1450° C. | mull | mull | mull | mull (Sm) | mull (Sm) | spin (Sm) |
| thermal shock- resistant temperature after first sintering at 1650° C. (°C: Δ Tc) | <190 | 200 | 210 | 190 | 200 | 210 |
| Thermal shock-resistant temperature after crystallization at 1450° C. (°C.: Δ Tc) | 190 | 210 | 300 | 190 | 190 | 210 |

In Table 1, "mull" denotes mullite, "spin" denotes spinel, and "Sm" denote a small amount.

In Table 1, in the case of samples #1 through #4, the amount of alumina (including alumina contained in kaolin) was increased to 88%. When the amount of MgO was increased from 2% to 4%, namely, the lower the ratio of kaolinite/MgO, the lower the density. As a result, it was possible to obtain a desired compactness of the material within the above-described composition range because there were conditions for maintaining a composition and density under which the liquid sintering occurs well. The crystal phase was not well formed during the first sintering at a temperature of 1650° C. for 2 hours, and the #4 sample formed only a small amount of spinel. Therefore, since the liquid sintering was not well performed based on the formation of the glass, it was not possible to obtain a desired compactly sintered material. In addition, if the samples were heat-processed at a temperature of 1450° C., a large amount of mullite was formed as revealed by X-ray diffraction analysis. In addition, in the case of samples #1 through #3, the mullite was greatly grown, and in the case of sample #4, there existed a small amount of mullite.

The alumina-mullite composite material prepared according to the present invention is capable of enduring a high temperature up to a maximum of 300° C. as indicated by the thermal shock-resistance test. In addition, the 85~96% alumina material is well applicable to an application in which there occurrs considerable thermal variation greatly varies. In more detail, the composition according to the present invention is well applicable to a high electric power lamp and reflector, a high temperature structural material (>300° C.), a high temperature industrial ceramic (a ceramic tube, a mechanical seal, a ceramic valve, etc), etc.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An alumina-mullite composite having mechanical and thermal shock resistance and no porosity formed from a mixture, comprising:
    alumina,
    4–30 weight % of an aluminum silicate material comprising Al and Si ions which are uniformly mixed, and
    0.5–6 weight % of an alkaline earth metal oxide,
    wherein the weight ratio of said alumina to a total of said alumina and the $Al_2O_3$ in said aluminum silicate material is 0.75–0.94 and the molar ratio of said alkaline earth metal oxide to $SiO_2$ is 1:2–1:3.

2. The alumina-mullite composite of claim 1, wherein said aluminum silicate material is selected from the group consisting of kaolinite, silimanite and kyanite.

3. The alumina-mullite composite of claim 1, wherein the composite comprises less than 3 weight % of said alkali earth metal oxide.

4. The alumina-mullite composite of claim 1, wherein the composite further comprises less than 10 weight % of $ZrO_2$.

5. A process for preparing an alumina-mullite composite having mechanical and thermal shock resistance and no porosity, comprising:
    sintering a mixture at a temperature of 1450°–1650° C. for 1–5 hours to produce a densified sintered body,
    cooling said sintered body to 1000° C., and crystallizing said sintered body at a temperature of 1200°–1500° C. for 1–20 hours,
    said mixture comprising:
        alumina,
        4–30 weight % of an aluminum silicate material comprising Al and Si ions which are uniformly mixed, and
        0.5–6 weight % of an alkaline earth metal oxide,
    wherein the weight ratio of said alumina to a total of said alumina and the $Al_2O_3$ in said aluminum silicate material is 0.75–0.94 and the molar ratio of said alkaline earth metal oxide to $SiO_2$ is 1:2–1:3.

6. The process of preparing an alumina-mullite composite of claim 5, wherein said aluminum silicate material is selected from the group consisting of kaolinite, silimanite and kyanite.

7. An alumina-mullite composite having mechanical and thermal shock resistance and no porosity prepared by the process according to claim 5.

8. A silica-alumina mixture for forming an alumina-mullite composite having mechanical and thermal shock resistance and no porosity, comprising:
    alumina,
    4–30 weight % of an aluminum silicate material comprising Al and Si ions which are uniformly mixed, and
    0.5–6 weight % of an alkaline earth metal oxide,
    wherein the weight ratio of said alumina to a total of said alumina and the $Al_2O_3$ in said aluminum silicate material is 0.75–0.94 and the molar ratio of said alkaline earth metal oxide to $SiO_2$ is 1:2–1:3.

\* \* \* \* \*